United States Patent [19]

Carroll

[11] Patent Number: 4,789,176

[45] Date of Patent: Dec. 6, 1988

[54] ADJUSTABLE CYCLE-TYPE SEAT POST ASSEMBLY

[75] Inventor: Timothy Carroll, Chicago, Ill.

[73] Assignee: Schwinn Bicycle Company, Chicago, Ill.

[21] Appl. No.: 129,234

[22] Filed: Dec. 7, 1987

[51] Int. Cl.⁴ ............................................. B62J 1/00
[52] U.S. Cl. ................................ 280/289 R; 248/161; 267/132; 297/195
[58] Field of Search ........... 280/283, 200, 220, 226 R, 280/281 R, 287, 289 R, 290, 274, 275, 278, 201; 74/493, 546; 297/195, 347, 199; 248/157, 188.5, 161, 404, 562, 624, 631, 566; 267/117, 124, 131, 132; 188/300

[56] References Cited

U.S. PATENT DOCUMENTS

| 598,234 | 2/1898 | Thompson | 280/283 |
| 622,179 | 3/1899 | Davis | 280/283 |
| 2,623,573 | 12/1952 | Gaetano | 280/283 |
| 2,644,504 | 7/1953 | Vick | 267/132 |
| 3,861,740 | 1/1975 | Tajima | 297/195 |
| 3,891,270 | 6/1975 | Crossman | 297/347 |
| 4,150,851 | 4/1979 | Cienfuegos | 297/195 |
| 4,580,835 | 4/1986 | Angell | 297/195 |

FOREIGN PATENT DOCUMENTS

| 2900780 | 7/1980 | Fed. Rep. of Germany | 248/161 |
| 2399353 | 4/1979 | France | 297/195 |
| 2441110 | 8/1980 | France | 297/195 |
| 17787 | 10/1898 | Switzerland | 280/283 |
| 14225 | of 1899 | United Kingdom | 280/283 |
| 29725 | of 1907 | United Kingdom | 280/283 |

Primary Examiner—David M. Mitchell
Assistant Examiner—Everett G. Diederiks, Jr.
Attorney, Agent, or Firm—McCaleb, Lucas & Brugman

[57] ABSTRACT

An adjustable cycle-type seat post assembly comprises a tubular seat post which fits slidably within an upstanding tubular seat mast. The seat post has a cylindrical bore with a closed upper end and an open lower end. A mounting shaft has an elongated body comprising upper and lower head portions with an intermediate portion between them. The upper head portion has a piston with O-ring seals engaging the cylindrical bore and defining with the closed upper end a variable volume air chamber. The intermediate portion has an axially extending slot engaging a pin secured to the seat post to limit relative axial movement and prevent relative torsional movement. The mounting shaft is secured in the seat mast by axially spaced openings in the lower head, one of which is engaged with a water bottle connecting stud extending through the seat mast wall. Ribs flanking the openings align them with the water bottle stud to facilitate assembly. A bicycle pump valve at the upper end of the seat post enables pressurization of the air chamber. A quick-release clamp at the top of the seat mast holds the seat post at a selected, elevated position.

14 Claims, 1 Drawing Sheet

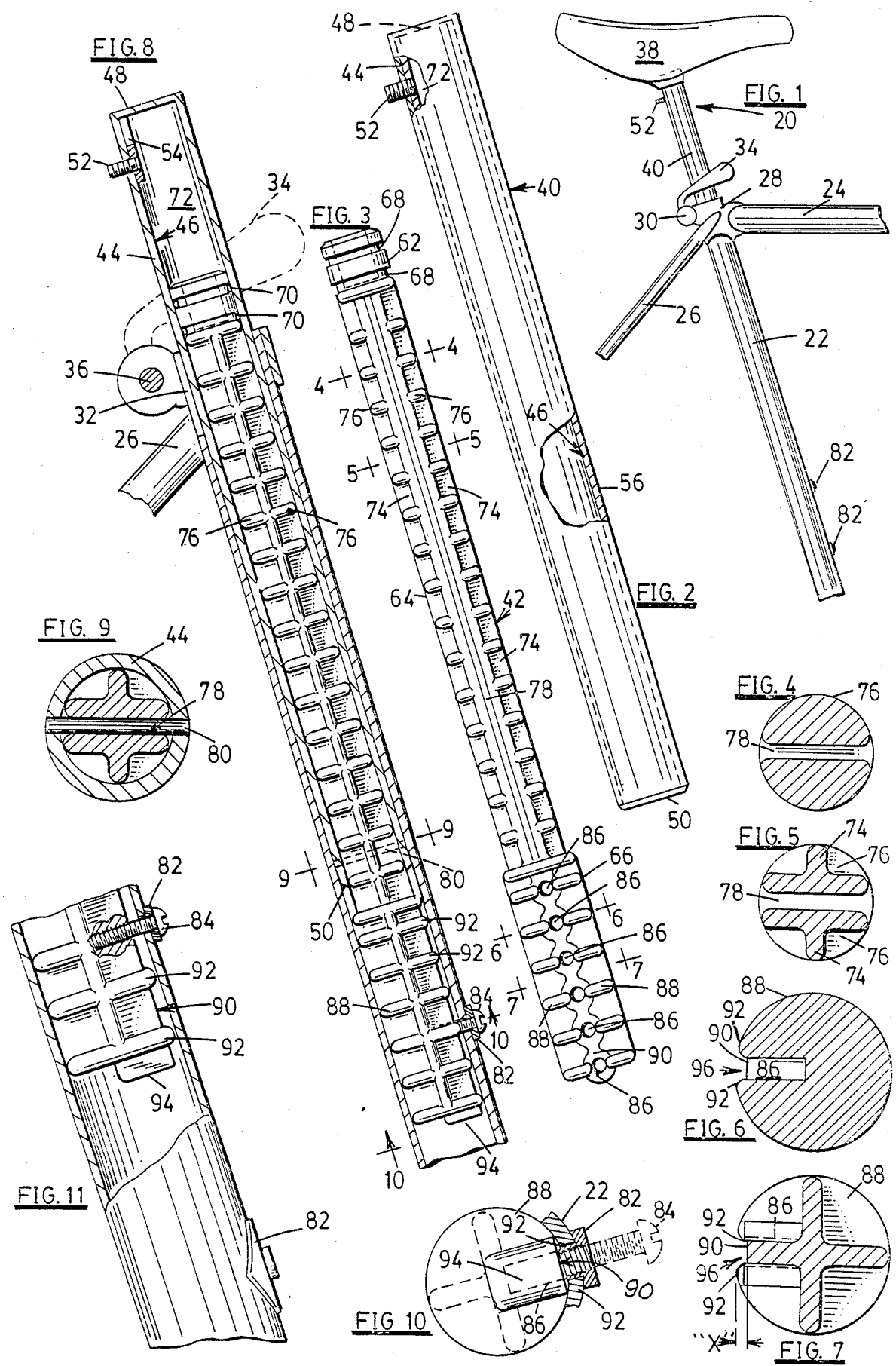

ADJUSTABLE CYCLE-TYPE SEAT POST ASSEMBLY

BACKGROUND OF THE INVENTION

This invention relates generally to a saddle for a bicycle, or a stationary cycle-type exerciser, or the like, that can be quickly and easily adjusted to various heights while it is in use.

The optimum height for a bicycle saddle is different when the bicycle is at rest and when it is in use. When the rider mounts and dismounts, or stops for traffic, the saddle should be low enough for his or her feet to touch the ground. However, once the bicycle is moving, the saddle should be raised to a desired level so the rider can apply an effective force on the pedals in the most comfortable position. This is especially important to minimize fatigue on long rides. Further, from the standpoint of both comfort and safety, it is an advantage to raise the saddle to one height for climbing a hill and to lower it for descending. The raised and lowered positions will be specifically different for different persons.

Loose gravel surfaces and curves, especially downhill curves, require lower saddle heights to bring the center of gravity down and thereby improve stability and rider control.

SUMMARY OF THE INVENTION

The primary purpose of the present invention is to provide an adjustable bicycle-type seat post assembly with which the rider can quickly and easily adjust the height of the saddle while mounted thereon.

Another purpose is to provide an adjustable seat post assembly which can be retrofitted into the tubular seat mast of most bicycle, tricycle, and cycle exerciser frames without altering the frame construction with special bolts, clamps, outside springs, or drilled holes.

Another purpose is to provide an adjustable seat post assembly which can be substituted for a standard, non-adjustable seat post, without making any structural changes in the tubular seat mast.

Another object is to provide such a completely self-contained adjustable seat post assembly including a tubular seat post with a mounting shaft telescopically slidable therein and piston and cylinder means defining a variable volume air chamber, valve means to pressurize the air chamber and urge the seat post upwardly, at least one opening in the mounting shaft engaging a water bottle stud extending through the seat mast wall, and a quick release clamp at the top of the seat mast.

Another object is to provide such a completely self-contained adjustable seat post assembly having blind guide ribs flanking the opening in the mounting shaft to facilitate blind assembly within the tubular seat mast.

BRIEF DESCRIPTION OF THE DRAWINGS

Other objects and advantages will be apparent from the following description in connection with the drawings in which:

FIG. 1 is a fragmentary side elevational view of a bicycle using an adjustable seat post assembly according to the present invention;

FIG. 2 is an enlarged side view of a seat post comprising one component of the seat post assembly;

FIG. 3 is an enlarged side view of a mounting shaft comprising another component of the seat post assembly;

FIGS. 4, 5, 6, and 7 are transverses, enlarged cross-sectional views of FIG. 3 taken on lines 4—4, 5—5, 6—6, and 7—7 respectively;

FIG. 8 is a fragmentary, enlarged view of FIG. 1 without the saddle and with portions cut away and other portions sectioned, to show the seat post assembly secured in working position;

FIG. 9 is a cross-sectional view of FIG. 8, taken on line 9—9;

FIG. 10 is a bottom view of the assembly taken on line 10—10 of FIG. 8; and

FIG. 11 is a fragmentary, enlarged, partially sectioned view of FIG. 8.

Like parts are referred to by like reference numerals.

DESCRIPTION OF THE PREFERRED EMBODIMENT

Referring now to the drawings, an adjustable seat post assembly illustrating a preferred embodiment of the invention is generally designated 20. As shown in FIGS. 1 and 8, it is telescopically slidably assembled, and operable within a tubular seat mast 22 having a frame top tube 24 and seatstay tubes 26. These frame tubes are joined, typically by welding or brazing, to a lug fitment 28 incorporating a quick-release clamp 30. The lug fitment is split on the backside as shown at 32. Turning clamp handle 34 in one direction tightens the seat post binder bolt 36 to grip the seat post and hold it in a selected elevated position. Turning the handle in the opposite direction loosens the clamp to enable resetting the saddle height. A saddle 38 is mounted at the top of the seat post. The saddle mounting and the quick-release clamp may be conventional and form no part of the present invention, so they are not shown in detail.

The adjustable seat post assembly 20 comprises a tubular seat post 40 and a mounting shaft 42.

The seat post 40 comprises a round cross-section tube 44 preferably of metal such as aluminum or steel with an outside surface sized to fit for up and down slidable movement within the tubular seat mast 22, and having an inside, polished cylindrical bore 46 with a closed upper end 48 and a lower open end 50. A bicycle-type air valve 52, commonly known as a "Schraeder" valve, is connected to the upper end of the seat post and is threadedly engaged with a reinforcing lug 54 secured to the inner wall.

The mounting shaft 42 is preferably injection-molded in a single piece from a durable plastics material such as a carbon-fiber-reinforced polycarbonate or nylon compound. It has an elongated body with an upper head portion 62, an intermediate portion 64, and a lower head portion 66.

The upper head portion 62 is a piston 62 is a piston having a pair of grooves 68 with O-rings 70 providing an air seal against the polished cylindrical bore 46. A variable volume air chamber 72 is thus provided between the piston and the closed upper end. Bicycle valve 52 has external threads engageable with the outlet fitting of a conventional bicycle pump (not shown) for pressurizing the air chamber.

The intermediate portion 64 of the mounting shaft is formed with a pair of diametrically opposite, longitudinally extending ribs 74,74 (FIGS. 3 and 5), a plurality of pairs of semi-circular ribs 76,76 (FIGS. 3, 5, and 8), and a longitudinall-extending through-slot 78 (FIGS. 3, 4, 5, and 9). As shown in FIGS. 8 and 9, the slot 78 engages a pin 80 which extends diametrically across the seat post tube 44. This pin and slot connection limits outward movement of the seat post tube 44 under air pressure in chamber 72, and prevents torsional movement of the seat post tube relative to the mounting shaft 42.

The lower head portion 66 has aperture means engageable with a securing member carried by the seat mast to anchor the seat post assembly within it. Inasmuch as most quality bicycles have internally threaded water bottle cage retaining nuts 82,82 the seat mast 22, as shown in FIG. 1, the suds or screws 84 which engage these nuts and which extend into the seat mast provide excellent components for removeably anchoring the seat post assembly. If a seat mast does not happen to have a water bottle retaining nut, it is easy for any bicycle mechanic to install one, making this invention suitable for retrofitting in existing bicycles, tricycles, and cycle exercisers.

To allow for variation in locations of the water bottle cage retaining nuts along the seat mast, the aperture means is here illustrated as a plurality of openings 86 in the lower head portion. These are spaced apart along the length of the mounting shaft as best shown in FIG. 3.

Fitting the seat post assembly 20 inside the seat mast 22 is a blind operation, it being impossible to see whether one of the openings 86 is aligned with one of the nuts 82. Accordingly, to facilitate this blind assembly operation, a circularly-extending rib 88 is provided in coplanar relationship with each opening 86. Further, each opening 86 terminates at a flat surface 90 which is recessed behind the rib ends 92,92 an amount "x" as best shown in FIGS. 7 and 10. This greatly facilitates assembly which is carried out efficiently by inserting the seat post assembly with the lower head portion 66 leading and initially oriented so the openings 86 face generally forwardly toward the nuts 82. At this time, the securing screw 84 will be only partially engaged with the nut 82 and will extend just slightly beyond the nut inside the seat mast tube 22 as shown in broken lines in FIG. 10. As soon as the partly cylindrical boss 94 which surrounds the lower opening 86 touches the partially-inserted screw 84, the seat post assembly can be rotated tentatively one direction or the other to find the space 96 (FIGS. 6 and 7) between the rib ends 92,92. The mechanic will then know the screw is vertically aligned with the openings 86 and can readily insert the assembly to the desired depth and tighten the screw 84 into the nearest opening 86.

Use and operation is believed to be apparent in view of the above description. When the adjustable seat post assembly 20 is fitted into the seat mast 22 and secured by stud 84, as shown in FIG. 11, and air under pressure is introduced into chamber 72 by a bicycle pump attached to the "Schraeder" valve 52, it will be ready for use. The air pressure will press the seat post 40 upwardly and can move it to its upper limit as permitted by pin 80 and slot 78 when the quick-release clamp 30 is loosened. To lower the saddle to a preferred level, the operator simply pushes it down by hand with a force sufficient to overcome the pressurized air in chamber 72 if he or she is standing beside it, or by lowering his or her weight on it if riding the bicycle, and then tightening the clamp. Because the air chamber 72 is closed, being sealed by O-rings 70,70 so air cannot escape, downward movement of the seat post tube 44 reduces the volume and correspondingly increases the pressure in the air chamber.

This adjustment can be made quickly while the bicycle, tricycle, or cycle exerciser is being ridden. For example, in starting to climb a steep grade, the rider may release the clamp, relieve the weight on the saddle to let is rise, and then clamp it in an elevated position. On reaching the top of the grade, the rider will reverse the adjustment and ride down hill with the saddle in a lowered position.

The embodiment described and shown to illustrate the present invention has been necessarily specific for purposes of illustration. Alterations, extensions, and modifications would be apparent to those skilled in the art. The aim of the appended claims, therefore, is to cover all variations included within the spirit and scope of the invention.

The embodiments of the invention in which an exclusive property or privilege is claimed are defined as follows:

1. In a cycle-type apparatus, the combination of:
    an upstanding tubular seat mast;
    a tubular seat post adapted to fit for up and down slidable movement within the seat mast, the seat post having a cylindrical bore with a closed upper end and an open lower end;
    a mounting shaft piston means at the upper end telescopically fitted within the cylindrical bore and defining with the closed upper end of the cylindrical bore a variable air chamber;
    air sealing means acting between the piston means and the cylindrical bore;
    fastening means at the lower end of the mounting shaft for removably securing the mounting shaft within the tubular seat mast;
    valve means at the upper end of the seat post for introducing pressurized air into the air chamber to urge said seat post in an upward direction; and
    clamp means at the top of the tubular seat mast engageable with the seat post to secure it in a selected elevated position.

2. In a cycle-type apparatus, the combination of claim 1 in which the fastening means comprises aperture means in the mounting shaft engageable with a stud extending through the wall of the tbular seat mast.

3. In a cycle-type apparatus, the combination of claim 2 in which the aperture means comprises a plurality of openings spaced apart along the length of the mounting shaft, the openings being selectively engageable with the stud to provide an optimum fit within the tubular seat mast.

4. In a cycle-type apparatus, the combination of claim 2 in which the stud is a water bottle retaining stud threadedly removably fastened in the wall of the tubular 5. An adjustable seat post assembly comprising:
    a tubular seat adapted to fit slidably within a tubular seat mast of a cycle-type apparatus, the seat post having a cylindrical bore with a closed upper end and an open lower end;
    a mounting shaft having piston means at the upper end telescopically fitted within the cylindrical bore and defining with the closed upper end of the cylindrical bore a variable volume air chamber;
    air sealing means acting between the piston means and the cylindrical bore;
    a plurality of axially spaced fastening means at the lower end of the mounting shaft for removably securing it in a selected axial position relative to a securing member carried within a tubular seat mast; and valve means at the upper end of the seat post for introducing pressurized air into the air chamber.

6. An adjustable seat post assembly according to claim 5 in which the fastening means at the lower end of the mounting shaft comprises a plurality of axially spaced aperture means adapted to engage a stud extending through a wall of a tubular seat mast.

7. An adjustable seat post assembly according to claim 6 in which the aperture means comprises a plurality of openings spaced apart along the length of the mounting shaft.

8. An adjustable seat post assembly comprising:
   a tubular seat post adapted to fit slidably within a tubular seat mast of a cycle-type apparatus, the seat post having a cylindrical bore with a closed upper end and an open lower end;
   a mounting shaft having an elongated body with an upper head portion, an intermediate portion, and a lower head portion;
   the upper head portion including piston means telescopically fitted within the cylindrical bore and defining with the closed upper end of the cylindrical bore a variable volume air chamber;
   air sealing means acting between the piston means and the cylindrical bore;
   the intermediate portion having an axially extending slot engaged with a pin carried by the seat post to limit relative axial movement between the seat post and mounting shaft, and to prevent relative torsional movement therebetween;
   the lower head portion including aperture means comprising a plurality of openings spaced apart along the length of the mounting shaft and being selectively engageable with a member carried by a seat mast to secure the mounting shaft at a selected axial position therein; and
   valve means at the upper end of the seat post for introducing pressurized air into the air chamber.

9. An adjustable seat post assembly according to claim 8 in which the air sealing means comprises O-rings seated in grooves formed in the upper head portion.

10. An adjustable seat post assembly according to claim 8 in which the slot extends diametrically through the intermediate portion and the pin is secured to diametrically opposite portions of the seat post.

11. An adjustable seat post assembly according to claim 8 having rib means flanking at least one of the openings in the lower head portion to facilitate aligning said opening with a stud in a tubular seat mast when assembling the mounting shaft therein.

12. An adjustable seat post assembly according to claim 11 in which said at least one opening is located in a recessed surface between said rib means.

13. An adjustable seat post assembly comprising:
   a tubular seat post adapted to fit slidably within a tubular seat mast of a cycle-type apparatus, the seat post having a cylindrical bore with a closed upper end and an open lower end;
   a mounting shaft having an elongated body with an upper head portion, an intermediate portion, and a lower head portion;
   the upper head portion including piston means telescopically fitted within the cylindrical bore and defining with the closed upper end of the cylindrical bore a variable volume air chamber;
   air sealing means acting between the piston means and the cylindrical bore;
   the intermediate portion having an axially extending slot engaged with a pin carried by the seat post to limit relative axial movement between the seat post and mounting shaft, and to prevent relative torsional movement therebetween;
   the lower head portion including aperture means engageable with a member carried by a seat mast to secure the mounting shaft therein;
   said aperture means being formed in a recessed surface in the lower head portion to facilitate aligning said aperture means with a securing member in a tubular seat mast when assembling the mounting shaft therein; and
   valve means at the upper end of the seat post for introducing pressurized air into the air chamber.

14. An adjustable seat post assembly according to claim 13 in which said lower head portion has rib means flanking said aperture means on opposite sides of said recessed surface to define the circumferential limits of said aperture means.

* * * * *

UNITED STATES PATENT AND TRADEMARK OFFICE
CERTIFICATE OF CORRECTION

PATENT NO. : 4,789,176
DATED : December 6, 1988
INVENTOR(S) : Timothy Carroll

It is certified that error appears in the above-identified patent and that said Letters Patent is hereby corrected as shown below:

Col. 2, line 1, "transverses", should be "transverse".

Col. 2, line 53, the second "62 is a piston", should be deleted.

Col. 3, line 9, "suds", should be "studs".

Signed and Sealed this

Second Day of May, 1989

Attest:

DONALD J. QUIGG

Attesting Officer

Commissioner of Patents and Trademarks